(12) United States Patent  
Hung

(10) Patent No.: US 7,391,328 B2  
(45) Date of Patent: Jun. 24, 2008

(54) RADIO FREQUENCY IDENTIFICATION SYSTEM

(75) Inventor: Li-Te Hung, Taipei (TW)

(73) Assignee: Compal Electronics, Inc., Taipei (TW)

( * ) Notice: Subject to any disclaimer, the term of this patent is extended or adjusted under 35 U.S.C. 154(b) by 272 days.

(21) Appl. No.: 11/224,648

(22) Filed: Sep. 12, 2005

(65) Prior Publication Data

US 2006/0187052 A1    Aug. 24, 2006

(30) Foreign Application Priority Data

Feb. 5, 2005    (TW)    ............... 94104047 A

(51) Int. Cl.
G08B 13/14    (2006.01)
(52) U.S. Cl. .................. 340/572.4; 340/572.7
(58) Field of Classification Search .............. 340/572.1, 340/572.2, 572.4, 572.7, 572.8, 539.11, 539.25, 340/568.1, 10.41, 10.42, 10.1; 714/819
See application file for complete search history.

(56) References Cited

U.S. PATENT DOCUMENTS

| 4,418,411 A | * | 11/1983 | Strietzel ..................... 714/819 |
| 5,751,223 A | * | 5/1998 | Turner ..................... 340/10.41 |
| 6,249,227 B1 | * | 6/2001 | Brady et al. ............. 340/572.1 |
| 7,069,100 B2 | * | 6/2006 | Monette et al. ............. 700/116 |

FOREIGN PATENT DOCUMENTS

| EP | 1 522 955 A1 | * | 4/2005 |
| EP | 1 528 768 A2 | * | 5/2005 |
| JP | 2005157787 A | * | 6/2005 |

* cited by examiner

*Primary Examiner*—Van T. Trieu
(74) *Attorney, Agent, or Firm*—Thomas, Kayden, Horstemeyer & Risley

(57) ABSTRACT

A radio frequency identification (RFID) system has a reader, a first antenna, a second antenna and a transponder. The first antenna is electrically connected to the reader, and the reader is used to generate a control signal and transmit the control signal through the first antenna. The second antenna is used to receive the control signal. The transponder is integrated into an electronic element of a portable electronic device and is electrically connected to the second antenna. The transponder is arranged to select a data signal according to the control signal and transmit the data signal to the reader through the second and first antennas.

19 Claims, 2 Drawing Sheets

RADIO FREQUENCY IDENTIFICATION SYSTEM

RELATED APPLICATIONS

The present application is based on, and claims priority from, Taiwan Application Serial Number 94104047, filed Feb. 5, 2005, the disclosure of which is hereby incorporated by reference herein in its entirety.

BACKGROUND

1. Field of Invention

The present invention relates to a radio frequency identification system. More particularly, the present invention relates to a portable electronic device whose internal electronic element integrates a transponder.

2. Description of Related Art

Radio frequency identification (RFID) is a non-contact automatic identification technique, which automatically identifies targets and obtains relative information by radio frequency signals, so as to have a fast and convenient process, omit manual operations during identifying, and be able to identify plural tags, even for dynamic targets, simultaneously. RFID is easily controlled, simple and practical, and especially applicable to automatic control techniques because it can be operated not only in read-only mode but also in read/write mode. Modern RFID applications include: logistics and supply management, manufacture and assemblage, airport baggage service, mail and express delivery, file tracking and library management, animal identification, access control, electrical entrance tickets and automatic fare collection.

A complete RFID system comprises two parts, a reader and a transponder. The transponder is generally called an RFID tag. The operational principle of the RFID system is to transmit radio frequency energy of a certain frequency to the transponder for driving it to transmit its tag ID code, or alternatively, to transmit the tag ID code by the transponder itself. The reader receives the tag ID code and transmits it to a central system for carrying out relative data processes.

Bar coding is another automatic identification technique which has been widely used. However, RFID has more advantages than bar coding. For example, RFID does not require line-of-sight reading and even detects through external packages of targets. RFID has a long lifespan and can be operated under adverse conditions. RFID can be easily attached to goods of different shapes, sizes and types. RFID has a long available range and can write or access data therein. The content of an RFID tag can be dynamically changed and has good security from unwanted access due to being protected by a password. RFID can simultaneously process multiple targets. Tracking and positioning a target with the RFID tag attached is available.

It is feasible to configure the RFID tag on a portable electronic device for personal identification of electronic financial commerce or access control. In prior art, the RFID tag generally is adhered onto a casing of the portable electronic device. However, the RFID tag configured by this conventional adhering manner is easily removed or worn because the portable electronic device is often carried along with the user. Moreover, if the RFID tag is a passive type, its signal transmission distance is very short and its signal intensity is weak; if the RFID tag is an active type, it has a short battery life.

SUMMARY

It is therefore an aspect of the present invention to provide a radio frequency identification (RFID) system, whose transponder is integrated into an electronic element of a portable electronic device, so as to have a farther signal transmission range than the conventional RFID tag and avoid being removed or being damaged by wear.

According to a first embodiment of the present invention, the RFID system has a reader, a first antenna, a second antenna and a transponder. The first antenna is electrically connected to the reader, and the reader is used to generate a control signal and transmit the control signal through the first antenna. The second antenna is used to receive the control signal. The transponder is integrated into an electronic element of a portable electronic device and is electrically connected to the second antenna. The transponder is arranged to select a data signal according to the control signal and transmit the data signal to the reader through the second and first antennas.

It is another aspect of the present invention to provide a transponder, which can decrease cost and increase lifespan and durability by sharing elements of the portable electronic device.

According to a second embodiment of the present invention, a transponder is provided for a radio frequency identification system which has a reader arranged to generate a control signal and transmit the control signal to the transponder through an antenna set. The transponder is integrated into an electronic element of a portable electronic device, and the transponder selects a data signal according to the control signal and transmits the data signal to the reader through the antenna set.

It is to be understood that both the foregoing general description and the following detailed description are examples and are intended to provide further explanation of the invention as claimed.

BRIEF DESCRIPTION OF THE DRAWINGS

These and other features, aspects and advantages of the present invention will become better understood with regard to the following description, appended claims and accompanying drawings where:

DESCRIPTION OF THE PREFERRED EMBODIMENTS

Figure 1:
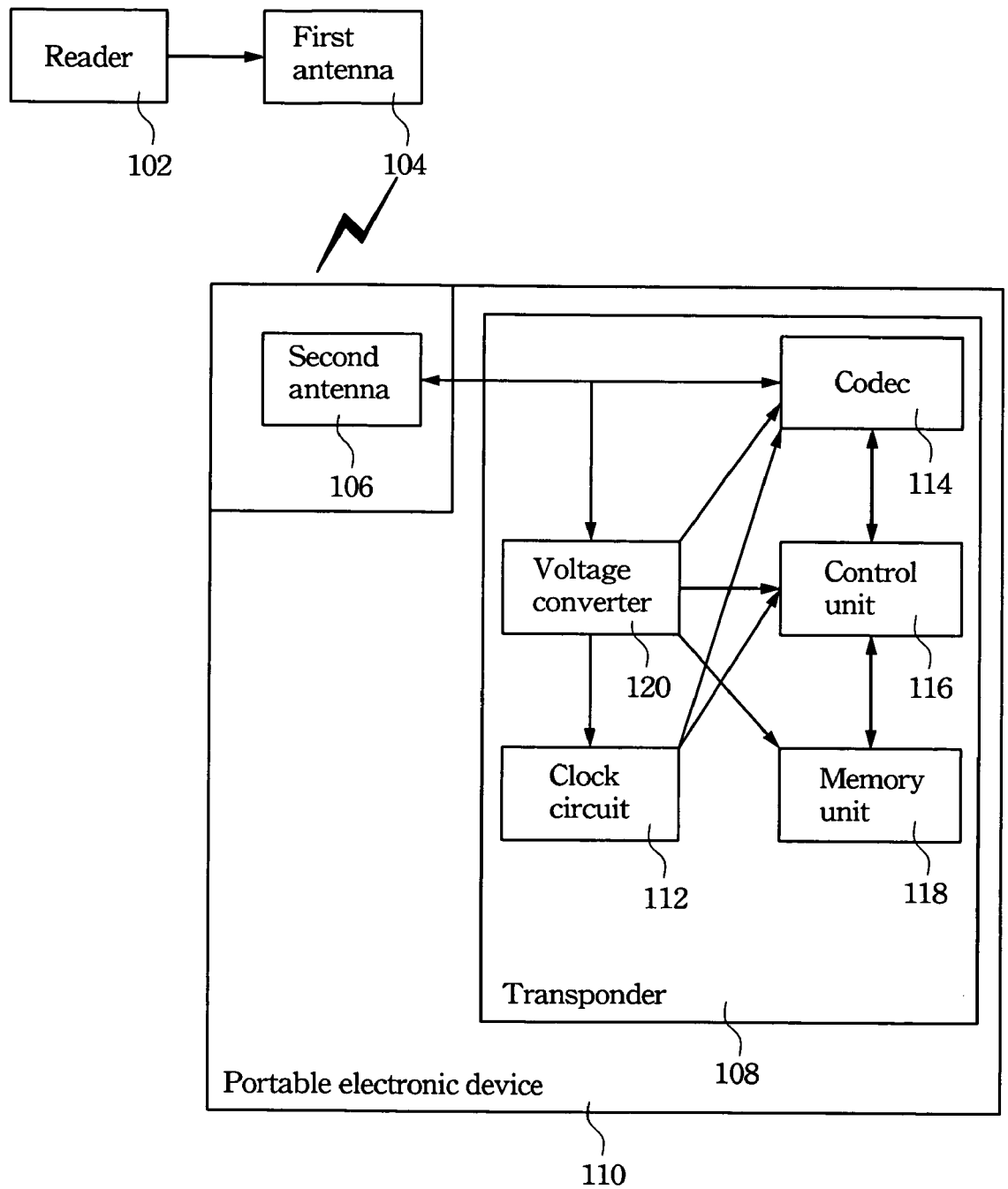
FIG. 1 is a schematic view of the first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The present invention integrates a transponder (i.e. an RFID tag), which conventionally stands alone, into an electronic element of a portable electronic device, such as an embedded controller or a Southbridge chip of a notebook computer or a personal digital assistant (PDA), so as to share components and thus prevent it from increasing cost as well as from the susceptibility of the conventional RFID tag to being removed or damaged by wear.

FIG. 1 is a schematic view of the first embodiment of the present invention, in which the transponder is a passive RFID tag powered by the electrical power that is induced by a signal that is transmitted by the reader.

As illustrated in FIG. 1, an RFID system 100 has a reader 102, a first antenna 104, a second antenna 106 and a transponder 108. The first antenna 104 is electrically connected to the reader 102, and the reader 102 generates a control signal and transmits the control signal through the first antenna 104. The second antenna 106 receives the control signal. The transponder 108 is integrated into an electronic element of a portable electronic device 110 and is electrically connected to the second antenna 106. The transponder 108 selects a data signal according the control signal and transmits the data signal to the reader 102 through the second and first antennas 106 and 104.

It is noted that, radio frequencies generally used in the RFID system include 13.56 MHz, 2.45 GHz, and those from 125 kHz to 135 kHz. The signals of the 13.56 MHz radio frequencies and those between 125 kHz and 135 kHz are transmitted and received by electromagnetic induction, and the signals of the 2.45 GHz radio frequency are transmitted and received by microwave communication.

Electromagnetic induction is to induce an electric current by the application of a magnetic field. A magnetic field is generated when the current of the reader 102 flows through a coil (e.g. the first antenna 104). By this magnetic field, an electric current can be generated in a coil-like antenna (e.g. the second antenna 106) of the transponder 108, for powering the circuitry of the transponder 108. Microwave communication is to exchange signals by electromagnetic waves. The electrical wave generated by the first antenna 104 of the reader 102 forms a resonance in the second antenna 106, further generating a current. The reader 102 and the transponder 108 thus can exchange data by the antennas 104 and 106.

The portable electronic device 110 in the first embodiment of the present invention, for example, can be a notebook computer, a personal digital assistant (PDA), a walkman, a digital camera or other electronic device that can be taken along with the user. The portable electronic device 110 generally contains an embedded controller (EC) or a Southbridge chip (SB), and therefore the transponder 108 can be integrated in the embedded controller or the Southbridge chip. The embedded controller is used to control the system setting of the portable electronic system 110, such as the battery setting, backlight setting, power-saving setting or direct playing function.

Moreover, the second antenna 106 in the first preferred embodiment of the invention, in addition to being separately configured, can alternatively share an antenna originally configured on the portable electronic device 110, such as a Bluetooth antenna or a wireless antenna. As long as the applicable radio frequency of the antenna (e.g. the Bluetooth antenna or the wireless antenna) originally configured in the portable electronic device 110 meets the communication requirement of the RFID system 100, it is feasible to directly use the antenna of the portable electronic device 110 to be the antenna of the RFID system 100.

The transponder 108 comprises a clock circuit 112, a codec 114, a control unit 116, a memory unit 118 and a power converter 120. When the portable electronic device 110 having the transponder 108 enters an effective range, the transponder 108 receives by the second antenna 106 an inductive signal, which is transmitted by the reader through the first antenna 104, and converts the inductive signal into electrical power by the voltage converter 120 for powering its clock circuit 112. The clock circuit 112 then provides a clock signal to the codec 114 and the control unit 116.

Subsequently, the transponder 108 receives by the second antenna 106 a control signal, which is transmitted by the reader 102, and converts the control signal into a control code by the codec 114. For example, the control code can instruct the transponder 108 to carry out the following functions: writing updated data into the memory unit 118, setting or canceling a sign (e.g. an access sign) or transmitting a data signal (e.g. a data signal containing production information). When the control code instructs the transponder 108 to transmit the data signal, the control unit 116 selects a data code from a plurality of predetermined codes stored in the memory unit 118 according to the control code, and the codec 114 converts the data code into the data signal for being transmitted by the second antenna 106.

Particularly, because the transponder 108 of the first preferred embodiment is integrated into the electronic element (e.g. the embedded controller or the Southbridge chip) of the portable electronic device 110, the foregoing control code can issue an instruction to the embedded controller or the Southbridge chip through the transponder 108, thus manipulating the portable electronic device 110.

The first preferred embodiment of the present invention is to integrate the transponder into the electronic element of the portable electronic device, which can prevent the wear damage and removal issues of the conventional RFID tag and also decrease the cost of the transponder by sharing elements of the portable electronic device.

Figure 2:
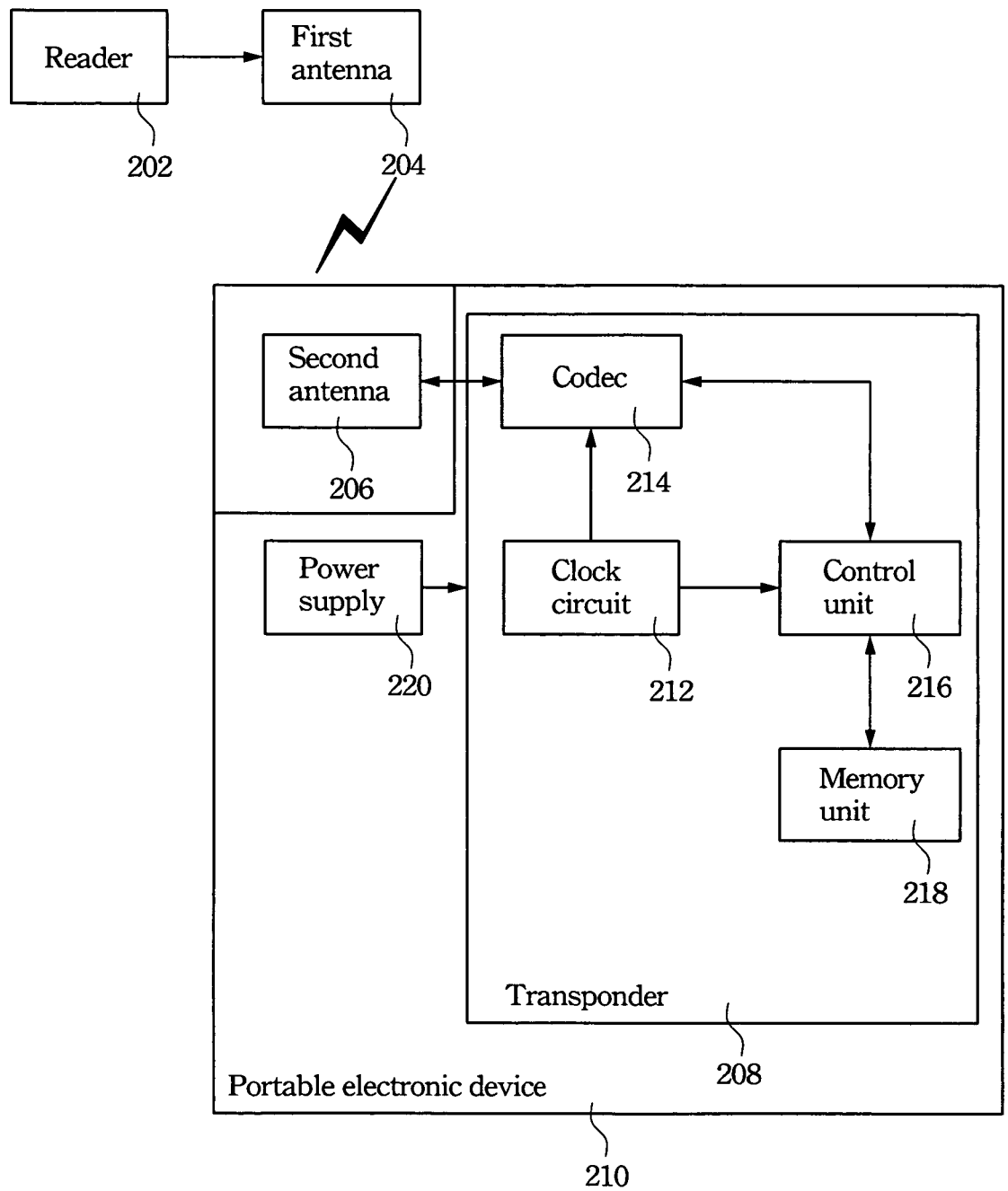
FIG. 2 is a schematic view of the second embodiment of the present invention.

FIG. 2 is a schematic view of the second embodiment of the present invention, in which the transponder is an active RFID tag, which can be powered by a power supply of the portable electronic device in addition to its own power source (e.g. a battery).

As illustrated in FIG. 2, an RFID system 200 has a reader 202, a first antenna 204, a second antenna 206 and a transponder 208. The first antenna 204 is electrically connected to the reader 202, and the reader 202 generates a control signal and transmits the control signal through the first antenna 204. The second antenna 206 receives the control signal. The transponder 208 is integrated into an electronic element of a portable electronic device 210 and is electrically connected to the second antenna 206. The transponder 208 selects a data signal according to the control signal and transmits the data signal to the reader 202 through the second and first antennas 206 and 204.

Similar to the first preferred embodiment, the portable electronic device 210 in the second embodiment of the present invention, for example, can be a notebook computer, a personal digital assistant (PDA), a walkman, a digital camera or other electronic device that can be taken along with the user. The portable electronic device 210 generally contains an embedded controller (EC) or a Southbridge chip (SB), and therefore the transponder 208 can be integrated in the embedded controller or the Southbridge chip. Moreover, the second antenna 206 in the second preferred embodiment of the invention, in addition to being separately configured, can alternatively share an antenna originally configured on the portable electronic device 210, such as a Bluetooth antenna or a wireless antenna.

The transponder 208 comprises a clock circuit 212, a codec 214, a control unit 216 and a memory unit 218. The transponder 208 is an active RFID tag, which is powered by a power supply 220 rather than by the electrical power induced from the signal transmitted by the reader as illustrated in the first preferred embodiment. Moreover, the power supply 220 can be additionally provided, such as by a battery, or share the power supply originally configured on the portable electronic device, having advantages such as increasing the lifespan of the active RFID tag (i.e. the transponder 208) and extending the signal transmission range due to providing greater electrical power.

The clock circuit 212 provides a clock signal to the codec 214 and the control unit 216. The transponder 208 receives by the second antenna 206 a control signal, which is transmitted by the reader 202, and converts the control signal into a control code by the codec 214. For example, the control code can instruct the transponder 208 to carry out the following functions: writing updated data into the memory unit 218, setting or canceling a sign (e.g. an access sign) or transmitting a data signal (e.g. a data signal containing production information). When the control code instructs the transponder 208 to transmit the data signal, the control unit 216 selects a data code from a plurality of predetermined codes stored in the memory unit 218 according to the control code, and the codec 214 converts the data code into the data signal for being transmitted by the second antenna 206.

Particularly, because the transponder 208 of the second preferred embodiment is integrated into the electronic element (e.g. the embedded controller or the Southbridge chip) of the portable electronic device 210, the foregoing control code can issue an instruction to the embedded controller or the Southbridge chip through the transponder 208, thus manipulating the portable electronic device 210.

By sharing the power supply of the portable electronic device, the second preferred embodiment can achieve a greater signal transmission range and extend the limited lifetime of the conventional active RFID tag due to unceasingly providing electrical power by the portable electronic device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A radio frequency identification system, comprising:
   a reader arranged to generate a control signal;
   a first antenna electrically connected to the reader, wherein the reader is arranged to transmit the control signal through the first antenna;
   a second antenna arranged to receive the control signal; and
   a transponder integrated into an electronic element of a portable electronic device and electrically connected to the second antenna, the transponder arranged to select a data signal according to the control signal and transmit the data signal to the reader through the second antenna and the first antenna, wherein the transponder comprises:
   a codec arranged to convert the control signal into a control code;
   a memory unit storing a plurality of predetermined codes; and
   a control unit electrically connected to the codec and the memory unit, wherein the control unit is arranged to select a data code from the predetermined codes according to the control code, and the codec is arranged to convert the data code into the data signal.

2. The radio frequency identification system as claimed in claim 1, wherein the electronic element is an embedded controller or a Southbridge chip.

3. The radio frequency identification system as claimed in claim 1, wherein the second antenna is a Bluetooth antenna or a wireless antenna of the portable electronic device.

4. The radio frequency identification system as claimed in claim 1, wherein the transponder is an active tag or a passive tag.

5. The radio frequency identification system as claimed in claim 1, wherein the reader is further arranged to transmit an inductive signal, and the transponder further comprises a voltage converter arranged to convert the inductive signal into an electric power for the transponder.

6. The radio frequency identification system as claimed in claim 1, wherein the transponder is powered by a power supply of the portable electronic device.

7. The radio frequency identification system as claimed in claim 1, wherein the transponder further comprises a clock circuit arranged to provide a clock signal to the control unit.

8. The radio frequency identification system as claimed in claim 1, wherein the control unit is arranged to write an updated data into the memory unit according to the control signal.

9. The radio frequency identification system as claimed in claim 1, wherein the transponder is arranged to issue an instruction to operate the portable electronic device.

10. The radio frequency identification system as claimed in claim 1, wherein the transponder is arranged to set or cancel a sign.

11. A transponder for a radio frequency identification system, the radio frequency identification system having a reader arranged to generate a control signal and transmit the control signal to the transponder through an antenna set, the transponder characterized by: the transponder being integrated into an electronic element of a portable electronic device, wherein the transponder is arranged to select a data signal according to the control signal and transmit the data signal to the reader through the antenna set, and the transponder further comprising:
   a codec arranged to convert the control signal into a control code;
   a memory unit storing a plurality of predetermined codes; and
   a control unit electrically connected to the codec and the memory unit, wherein the control unit is arranged to select a data code from the predetermined codes, and the codec is arranged to convert the data code into the data signal.

12. The transponder as claimed in claim 11, wherein the electronic element is an embedded controller or a Southbridge chip.

13. The transponder as claimed in claim 11, wherein the transponder is an active tag or a passive tag.

14. The transponder as claimed in claim 11, wherein the transponder further comprises a voltage converter arranged to convert an inductive signal transmitted from the reader into an electric power for the transponder.

15. The transponder as claimed in claim 11, wherein the transponder is powered by a power supply of the portable electronic device.

16. The transponder as claimed in claim 11, wherein the transponder further comprises a clock circuit arranged to provide a clock signal to the control unit.

17. The transponder as claimed in claim 11, wherein the control unit is arranged to write an updated data into the memory unit according to the control signal.

18. The transponder as claimed in claim 11, wherein the transponder is arranged to issue an instruction to operate the portable electronic device.

19. The transponder as claimed in claim 11, wherein the transponder is arranged to set or cancel a sign.

* * * * *